United States Patent

Weston et al.

[11] Patent Number: 5,799,069
[45] Date of Patent: Aug. 25, 1998

[54] METHOD AND APPARATUS FOR DYNAMICALLY ADAPTING THE CLOCK RATE AND DATA TRANSFER RATE OF PHONE-LINE POWERED MODEMS.

[75] Inventors: Patrick E. Weston, Cameron Park; Harry Laswell, Sacramento, both of Calif.

[73] Assignee: Intel Corporation, Santa Clara, Calif.

[21] Appl. No.: 751,245

[22] Filed: Nov. 18, 1996

Related U.S. Application Data

[63] Continuation of Ser. No. 314,656, Sep. 29, 1994, abandoned.
[51] Int. Cl.$^6$ .................................................. H04M 11/00
[52] U.S. Cl. ........................... 379/93.33; 379/93.26; 379/93.31; 375/222

[56] References Cited

U.S. PATENT DOCUMENTS

| | | | |
|---|---|---|---|
| 4,630,126 | 12/1986 | Kaku et al. | 375/222 |
| 4,756,007 | 7/1988 | Qureshi et al. | 379/93 |
| 4,803,719 | 2/1989 | Ulrich | 379/93 |
| 5,018,190 | 5/1991 | Walker et al. | 379/95 |

FOREIGN PATENT DOCUMENTS

| | | | |
|---|---|---|---|
| 000561644 | 9/1993 | European Pat. Off. | 379/93 |

OTHER PUBLICATIONS

"TMS320 Second–Generation Digital Signal Processors" data sheet (Texas Instruments, Nov. 1990, pp. A–3–A–8.
"80C196KB10/83C196B10/80C196KB12/83C196KB12 Commercial/Express CHMOS Microcontroller" data sheet (Order No. 270918–002, Intel Corp., Nov. 1991, pp. 8–1—8–21).

"SN54HC160, SN54HC162, SN74HC160, SN74HC162 Synchronous 4–Bit Decade Counters" data sheet (Texas Instruments, pp. 2–219—2–230.

Primary Examiner—Wing F. Chan
Assistant Examiner—Stephen W. Palan
Attorney, Agent, or Firm—Blakely, Sokoloff, Taylor & Zafman

[57] ABSTRACT

Methods and apparatus are disclosed for detecting the amount of the power available from a phone line and for adjusting the clock rate and data transfer rate of a modem or a device that transfers data over the phone line to provide the best possible performance for the available phone-line power. A method of operating a device for transferring data over a phone line includes the following steps: setting the device off hook; measuring the voltage level of the phone line; determining the amount of the power available from the phone line; selecting a clock rate for the device; setting the device to operate at the clock rate; placing a call; selecting a data transfer rate; and transferring the data. An apparatus for transferring data over a phone line includes a clock generator for generating a first clock signal of a first frequency; a frequency divider for generating multiple clock signals of different frequencies and for outputting one of the multiple clock signals; a data pump for modulating and demodulating data; a sensor for sensing the voltage level of the phone line; a microcontroller for controlling the frequency divider, the data pump and the sensor; a line isolator for blocking hazardous electrical signals from coming into the apparatus; an interface for coupling the microcontroller to a computer host; and a power converter for converting a DC voltage of the phone line to an appropriate DC power supply voltage to be used by the apparatus.

25 Claims, 8 Drawing Sheets

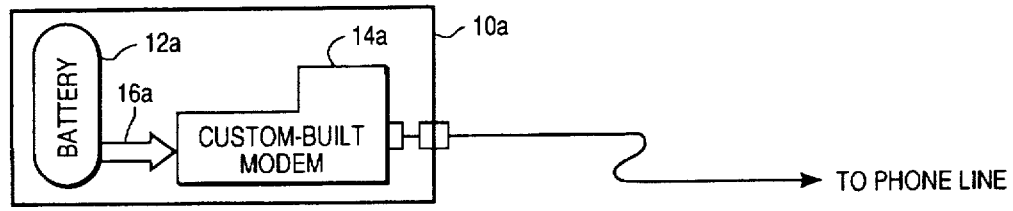
FIG_1A (PRIOR ART)
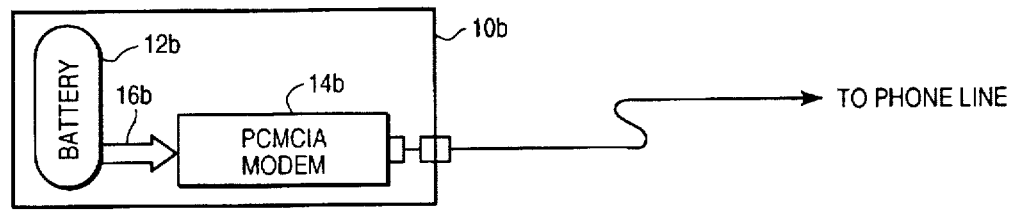
FIG_1B (PRIOR ART)
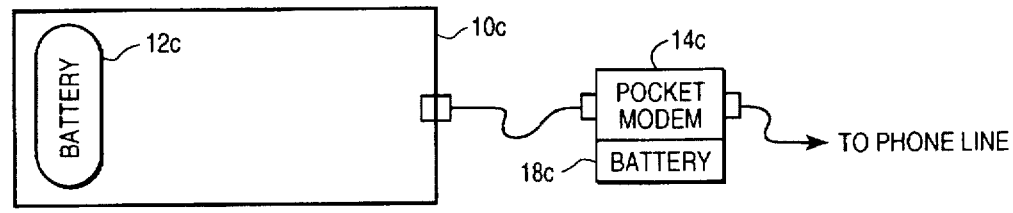
FIG_1C (PRIOR ART)
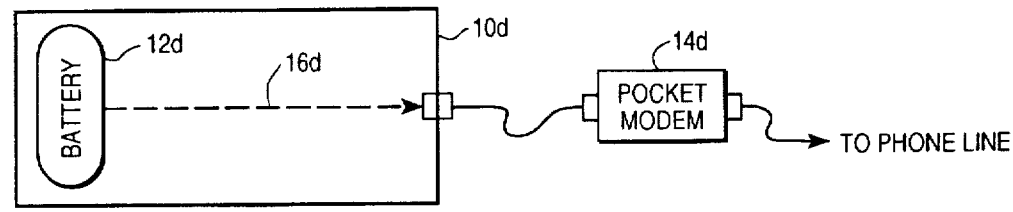
FIG_1D (PRIOR ART)
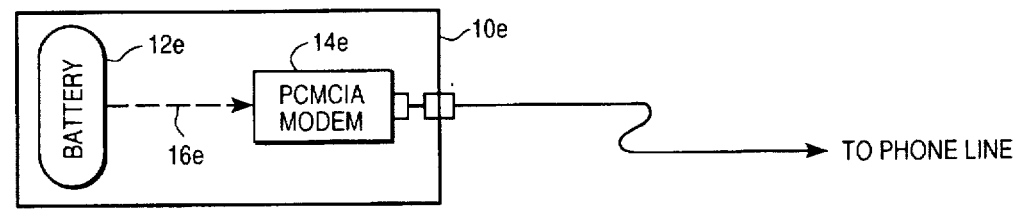
FIG_1E (PRIOR ART)

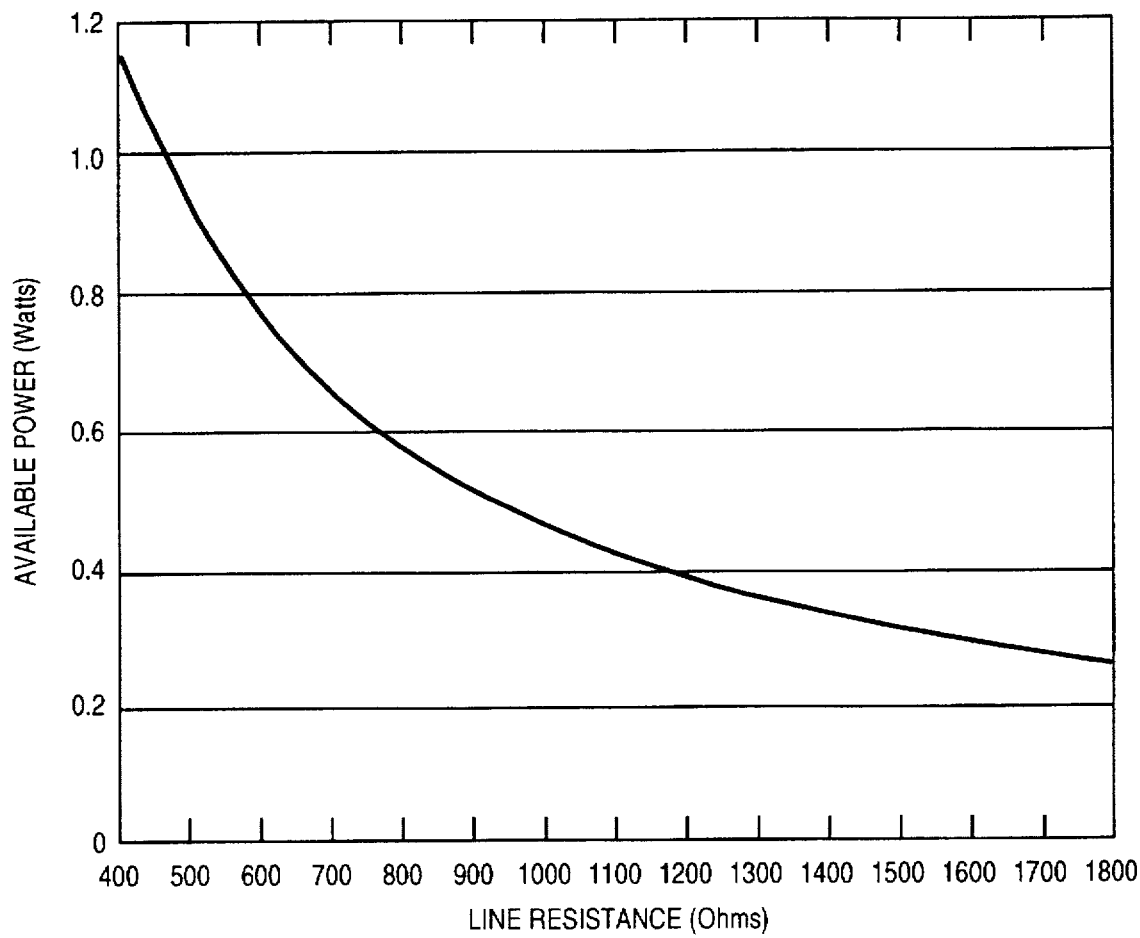
FIG_2 (PRIOR ART)

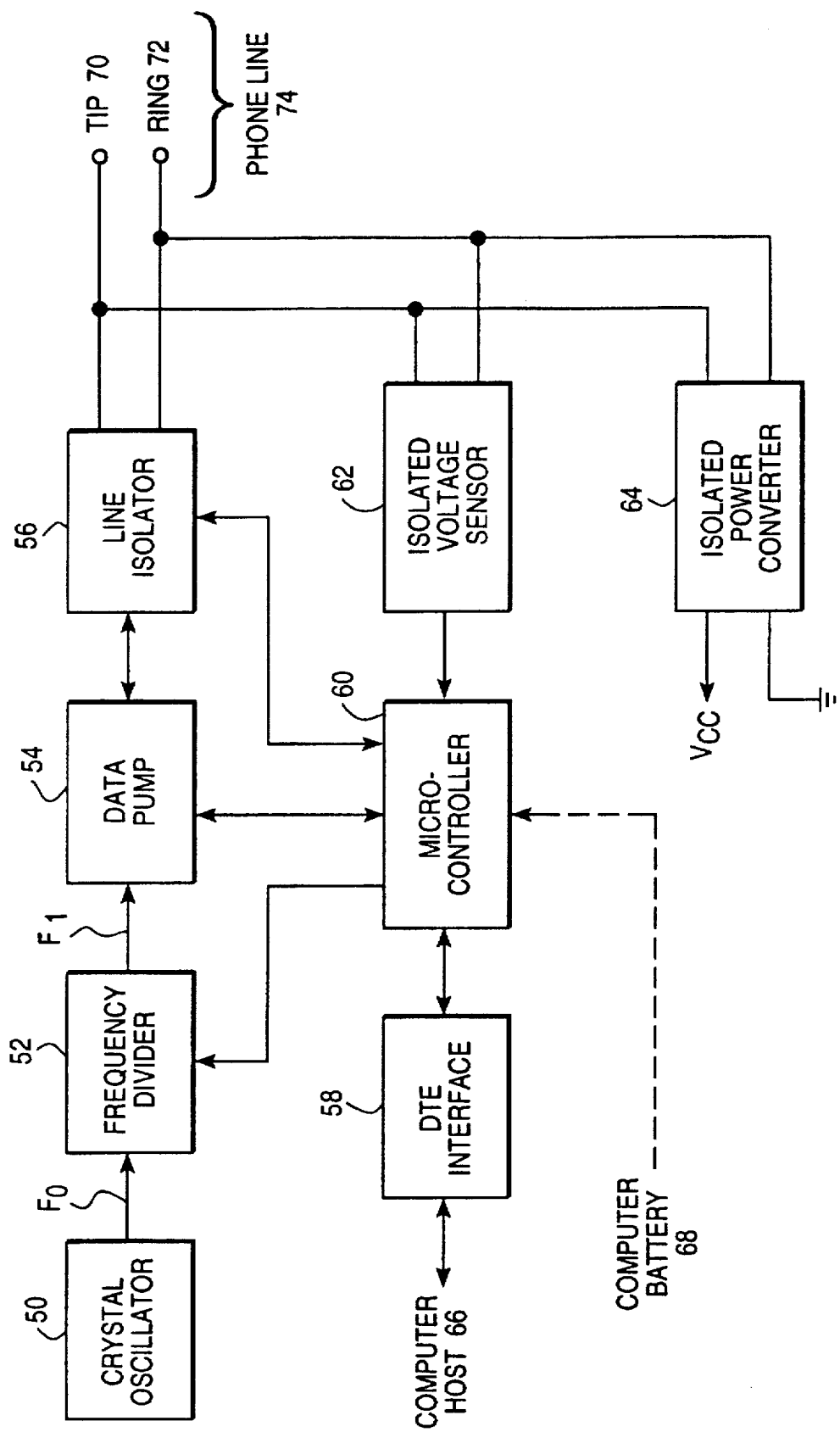
FIG_3

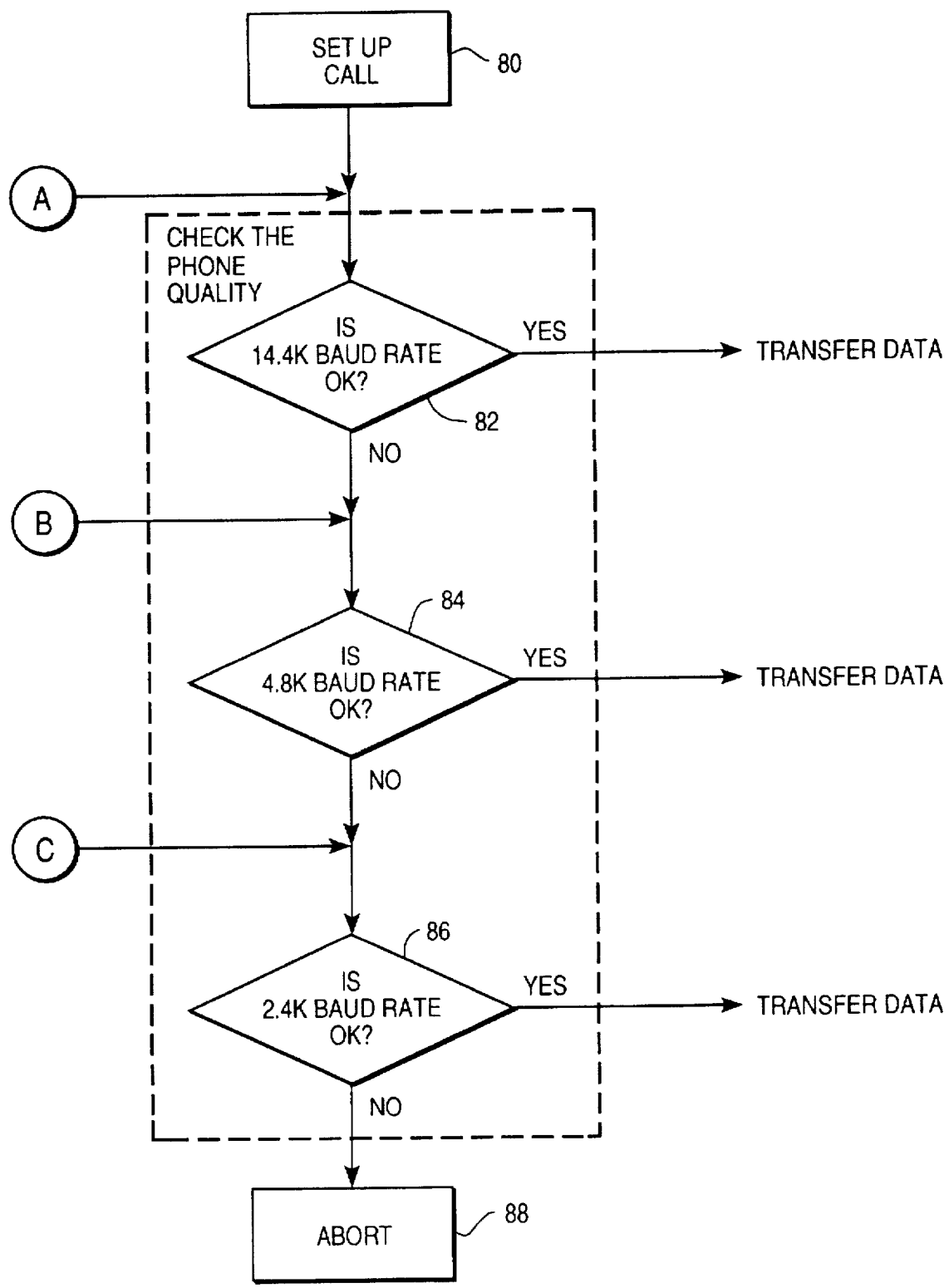
FIG_4A (PRIOR ART)

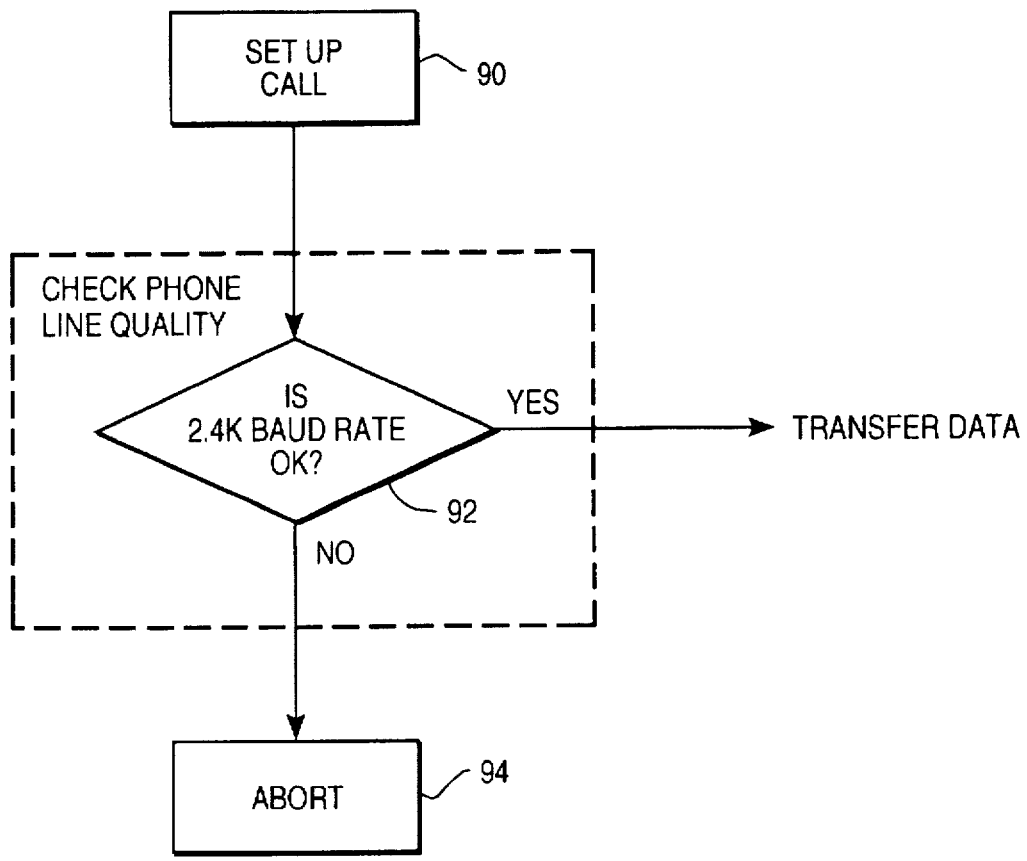
FIG_4B (PRIOR ART)

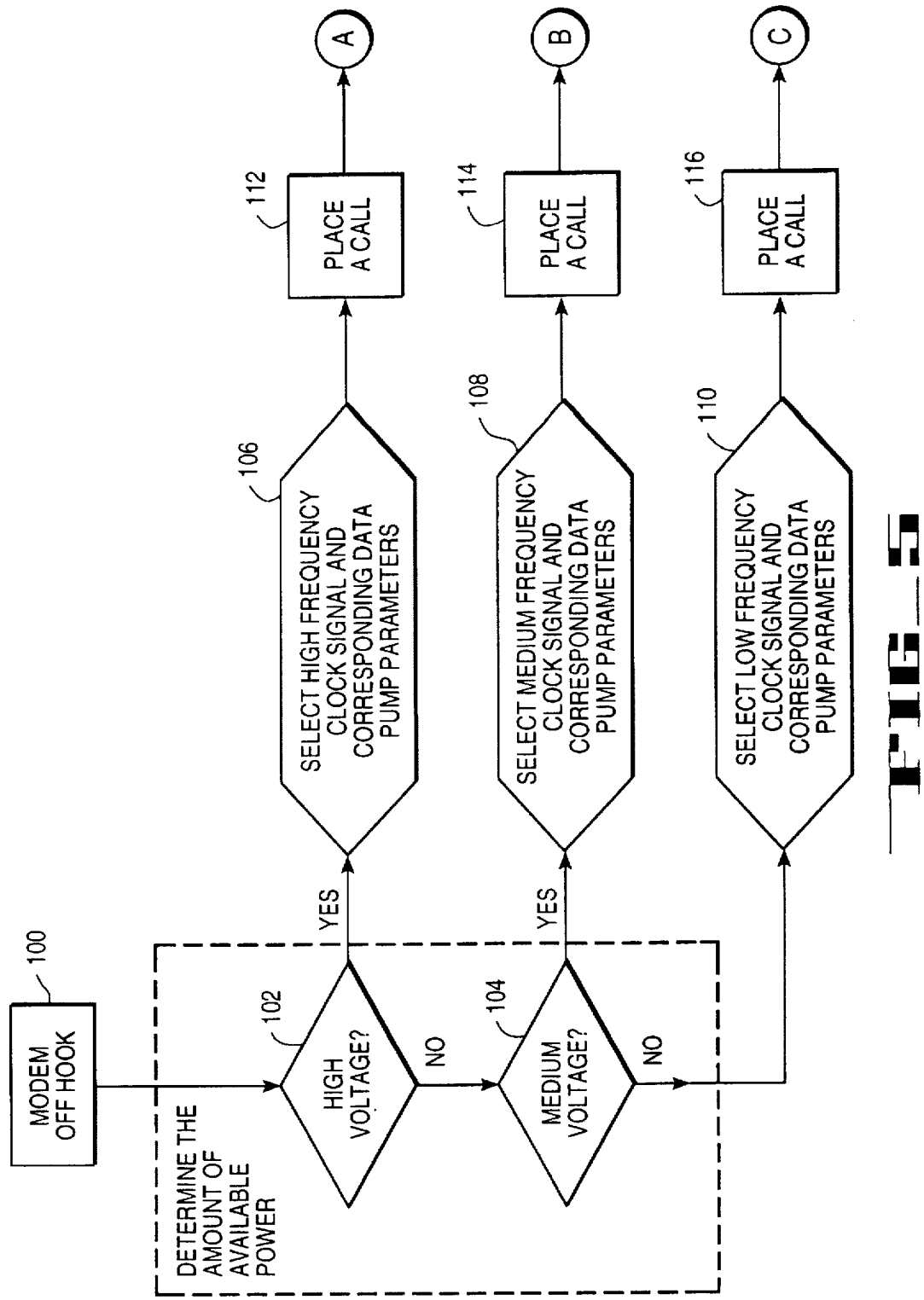
FIG._5

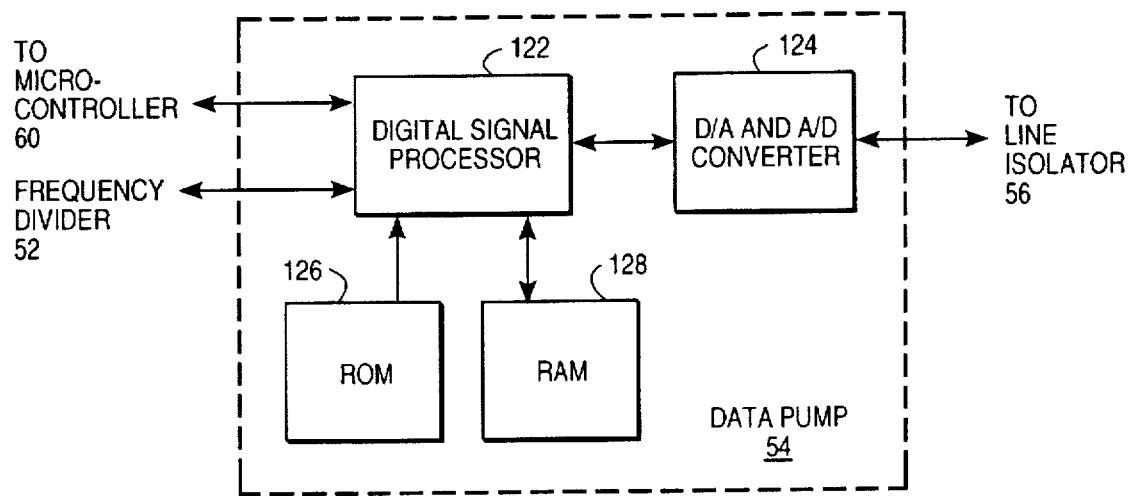
FIG_6
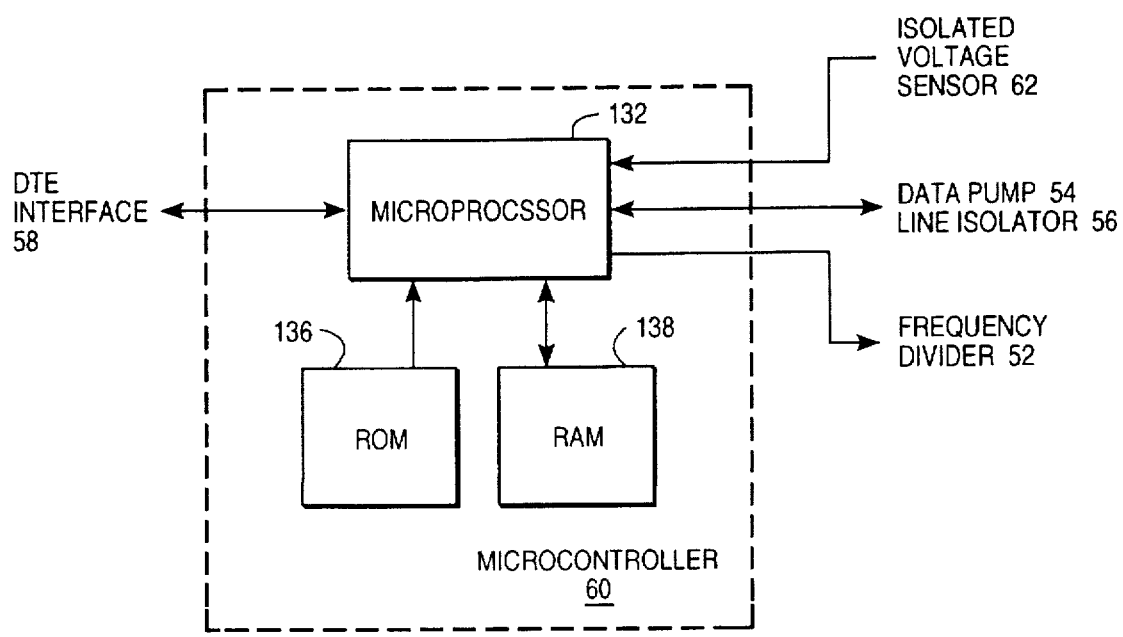
FIG_7

METHOD AND APPARATUS FOR DYNAMICALLY ADAPTING THE CLOCK RATE AND DATA TRANSFER RATE OF PHONE-LINE POWERED MODEMS.

CROSS-REFERENCES TO RELATED APPLICATIONS

This is a continuation of a U.S. patent aplicaton (Application Ser. No. 08/314,656) filed Sep. 29, 1994, now abandoned.

BACKGROUND OF THE INVENTION

1. Field of the Invention:

The present invention relates to modems or devices used to transfer data over a phone line and, in particular, to the modems or devices that derive power from the phone line.

2. Background Information:

Definition

A central office exchange is a place where a communication common carrier locates the equipment which interconnects subscribers and circuits. A private branch exchange is a local place where a communication common carrier locates the equipment which interconnects subscribers and circuits. A private branch exchange typically serves a smaller community than a central office exchange.

A subscriber loop length is defined as the service distance between a user's modem and the central office exchange or the private branch exchange. A short subscriber loop length indicates a short distance between the user's modem and the central office exchange or the private branch exchange.

An "off-hook" state is equivalent to lifting a receiver off of a phone. A modem is in an "off-hook" state when the modem is presented to a phone line as a load, prior to or during the placement of a call.

DESCRIPTION OF THE RELATED ART

While modems used with non-portable computers such as desktop computers have essentially "unlimited" power available because they derive power from the computers' power supply or wall sockets, modems used in conjunction with portable computers have a limited amount of power available because they derive power from batteries or phone lines.

FIGS. 1a–1e illustrate different types of modems that are used in conjunction with portable computers. In FIG. 1a, a computer 10a, which may be a laptop computer or a notebook computer, has a battery 12a as its power supply and a custom-built modem 14a that derives its power from battery 12a. The battery capacity determines the amount of power available to modem 14a. In FIG. 1b, a computer 10b, which may be a laptop computer or a notebook computer, has a battery 12b as its power supply and an internal modem 14b having an interface incorporating personal computer memory card international association (PCMCIA) standards. Modem 14b derives its power from battery 12b. Depending on the battery capacity, batteries 12a and 12b in FIGS. 1a and 1b may or may not be able to provide enough power for modems 14a and 14b, respectively, to operate at a high data transfer rate (e.g., 14400 bits-per-second).

In FIG. 1c, a portable computer 10c has a battery 12c and is coupled to an external pocket modem 14c, in the size of a cigarette pack, having its own battery 18c. Battery 18c is typically a 9-volt battery and thus has a limited battery capacity. In FIG. 1d, a portable computer 10d has a battery 12d and is coupled to an external pocket modem 14d that derives most of its power from a phone line. Battery 12d provides only minimal power to start pocket modem 14d. During operation, the phone line provides power to pocket modem 14d.

FIG. 1e shows a personal digital assistance (PDA) 10e, such as a palmtop computer, having a battery 12e and a PCMCIA modem 14e. Because battery 12e is typically an AA battery, the amount of power available to modem 14e is almost non-existent. Battery 12e provides only enough power for PCMCIA modem 14e to receive initial commands from PDA 10e. Once in operation, PCMCIA modem 14e derives its power from the phone line.

Although modems are currently capable of operating at 14400 bits-per-second, a modem that derives most of its power from a phone line, such as those shown in FIGS. 1c–1e, typically operates at 2400 bits-per-second because of the limited power availability. As the data transfer rate of the modem becomes higher, the modem requires more computing power, and hence more battery power. Thus, unless the phone line provides enough power for 14400 bits-per-second data transfer rate, one cannot operate a modem at that rate.

FIG. 2 is a plot showing the available power from a phone line versus the line resistance. As the distance (or subscriber loop length) between the modem and a central office exchange or a private branch exchange office becomes longer, the line resistance becomes larger. As the line resistance increases, the amount of power available from the phone line decreases, as shown in FIG. 2. As the power decreases, the modem's computing power decreases, thus the potential data transfer rate also decreases. While transferring data at 14400 bits-per-second typically requires 0.5–0.6 watts, transferring data at 2400 bits-per-second requires only 0.3 watts. Thus if there are only 0.3 watts available from the phone line, then the modem deriving power from the phone line can transfer data only at a low data transfer rate such as 2400 bits-per-second. Although a short subscriber loop provides power sufficient for 14400 bits-per-second, because a long subscriber loop provides power only enough to allow data transfer at 2400 bits-per-second, conventional modems that derive most of their power from the phone line are fixed to the 2400 bits-per-second so that the modems can be used for both long and short subscriber loop lengths.

The drawback of prior art modems that derive power from the phone line is that they require a fixed low data transfer rate such as 2400 bits-per-second. Therefore, prior art modems cannot operate at a higher data transfer rate even if the subscriber loop length is short, providing power sufficient for the higher data transfer rate. If the subscriber loop is long, then there is only low power available to the user, and the modem operates at an optimum data transfer rate for the long subscriber loop length. However, if the subscriber loop is short, then the modem does not operate at an optimum data transfer rate for the power available. While the phone line provides high enough power for the modem to transfer data at a high rate, since the modem is fixed at the 2400 bits-per-second, the modem cannot transfer data at the high rate, and thus the user cannot benefit from the short local subscriber loop.

It would be advantageous, and is therefore an object of the present invention, to detect the amount of power available from a phone line and to adjust the frequency of the clock signal of the modem and the data transfer rate accordingly.

SUMMARY OF THE INVENTION

From the foregoing it can be appreciated that it would be desirable to provide a mechanism that adjusts the clock rate and the data transfer rate of a modem according to the amount of the power available from a phone line. Hence, it is an object of the present invention to provide methods and apparatus for detecting the amount of the power available from a phone line so that a modem or any device that transfers data over the phone line can adjust its clock rate and data transfer rate to provide optimal performance for the available phone-line power.

According to the present invention, a method of operating a modem or a device for transferring data over a phone line includes the following steps: setting the modem off hook; measuring the voltage level of the phone line; determining the amount of the power available from the phone line; selecting a clock rate for the modem; setting the modem to operate at the clock rate; placing a call; selecting a data transfer rate; and transferring the data at the selected data transfer rate.

An apparatus for transferring data over a phone line according to the present invention includes a clock generator for generating a first clock signal of a first frequency; a frequency divider coupled to the clock generator for generating multiple clock signals of different frequencies and for outputting one of the multiple clock signals; a data pump coupled to the frequency divider for modulating and demodulating data; a sensor for coupling to the phone line and for sensing the voltage level of the phone line; a microcontroller for controlling the frequency divider, the data pump and the sensor; a line isolator for blocking hazardous electrical signals from coming into the apparatus; an interface for coupling the microcontroller to a computer host; and a power converter for converting a DC voltage of the phone line to an appropriate DC power supply voltage to be used by the apparatus.

The microcontroller of the present invention operates as follows: The microcontroller directs the sensor to measure the voltage level of the phone line. Once the sensor sends the measured data to the microcontroller, the microcontroller determines the appropriate clock rate to be used for the data pump. The microcontroller sends a control signal to the frequency divider to output the clock signal corresponding to the appropriate clock rate and another control signal to the data pump so that the data pump can be set up to operate at that clock rate.

BRIEF DESCRIPTION OF THE DRAWINGS

The objects, features and advantages of the present invention will be apparent from the following detailed description in which:

FIG. 1a presents a prior art portable computer having a custom-built modem.

FIG. 1b presents a prior art portable computer having a PCMCIA modem.

FIG. 1c presents a prior art portable computer coupled to an external pocket modem wherein the external pocket modem has a separate battery.

FIG. 1d presents a prior art portable computer coupled to an external pocket modem that derives its power mainly from a phone line.

FIG. 1e presents a prior art personal digital assistance (PDA) having a PCMCIA modem.

FIG. 2 presents a prior art plot showing the available power versus the line resistance.

FIG. 3 presents a block diagram of a modem according to one embodiment of the present invention.

FIG. 4a is a flow chart showing the operation of a prior art modem that has essentially "unlimited" power available to the modem.

FIG. 4b is a flow chart showing the operation of a prior art modem powered mainly by a phone line.

FIG. 5 is a flow chart showing the operation of a modem according to one embodiment of the present invention.

FIG. 6 is a block diagram of a data pump according to the present invention.

FIG. 7 is a block diagram of a microcontroller according to the present invention.

DETAILED DESCRIPTION OF THE INVENTION

Figure 8:
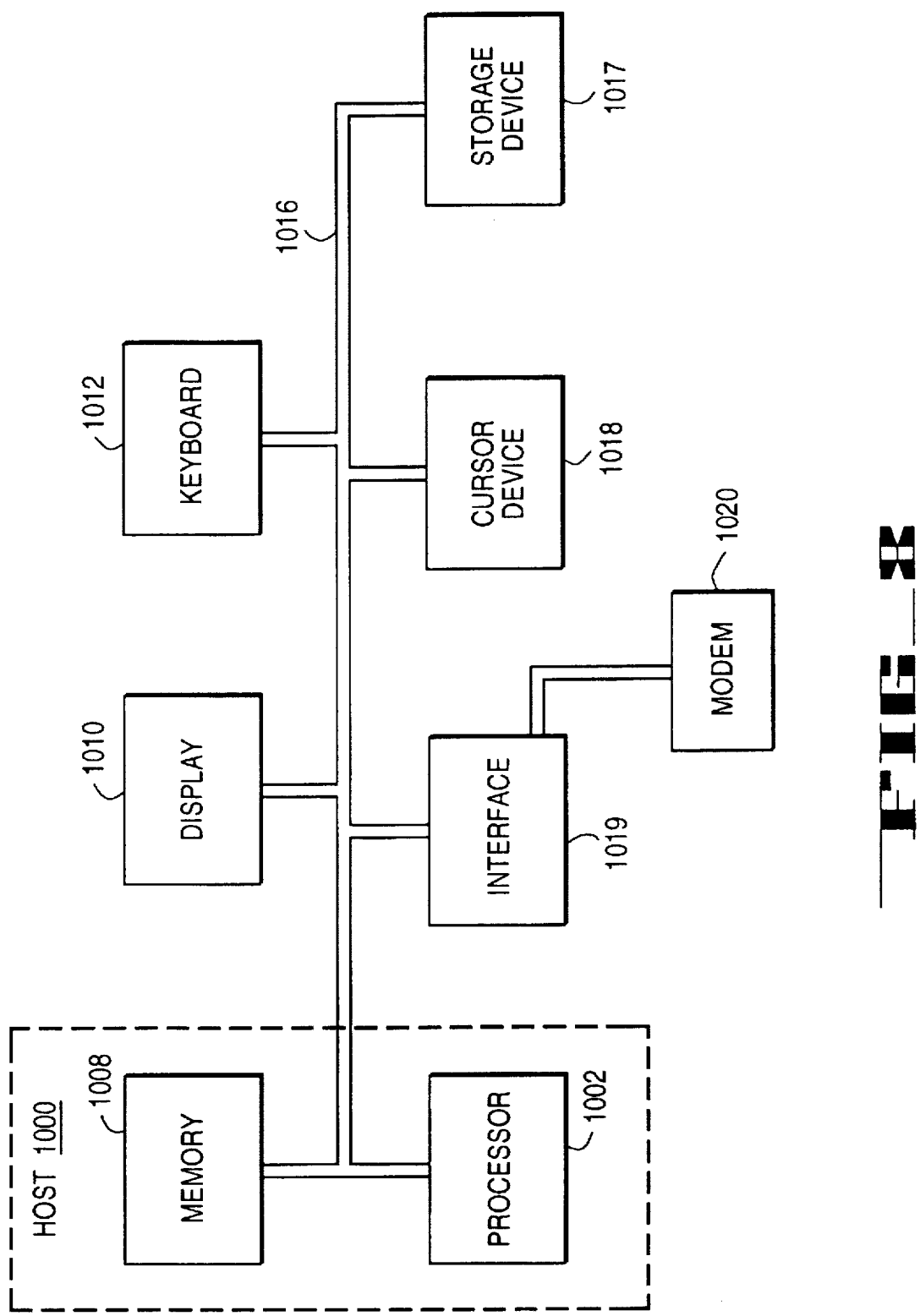
FIG. 8 is a block diagram of a computer system utilizing a modem of the present invention.

The present invention provides a method and apparatus for implementing a phone-line powered modem that can dynamically adapt the clock rate and the data transfer rate. In the following detailed description, numerous specific details are set forth such as particular hardware configurations, devices, programming codes, and data control structures in order to provide a thorough understanding of the present invention. It will be appreciated, however, by one having ordinary skill in the art that the present invention may be practiced without such specific details. In other instances, well-known structures and data are shown in block diagram form in order not to obscure the present invention unnecessarily.

Now referring to FIG. 3, a block diagram of a modem is presented according to one embodiment of the present invention. The modem includes a clock generator such as a crystal oscillator 50 for providing a first clock signal of one frequency ($F_o$) and a programmable frequency divider 52 for generating multiple clock signals of different frequencies from the first clock signal and for outputting one of the multiple clock signals ($F_1$), a data pump 54 for converting the data signals coming from a computer host 66 into a form compatible with a phone network and for converting the signals coming from the phone network into a form compatible with computer host 66, and a line isolator 56 for providing isolation to prevent hazardous electrical signals from being carried into the modem. Phone line 74 has two wires: a tip 70 and a ring 72.

The modem further includes a data terminal equipment (DTE) interface 58 for interfacing the modem to a DTE such as computer host 66, a microcontroller 60 for controlling and sequencing various components of the modem, an isolated voltage sensor 62 for sensing the voltage level of phone line 74 to determine the amount of power available from phone line 74, and an isolated power converter 64 for converting a direct-current (DC) voltage of phone line 74 into an appropriate DC power supply voltage to be used by the modem components.

Continuing to refer to FIG. 3, in operation, after computer host 66 directs the modem to send data, the modem goes "off hook." Microcontroller 60 sends an appropriate signal to phone line 74 so that current flows into the modem from phone line 74. Isolated voltage sensor 62 measures the voltage level of phone line 74 and provides a digital signal to microcontroller 60 using an analog-to-digital (A/D) converter. Upon receiving the digital signal from isolated voltage sensor 62, microcontroller 60 determines the appropriate frequency for the clock signal to be used in the modem corresponding to the power available at phone line 74. Microcontroller 60 sends a control signal to frequency divider 52 so that frequency divider 52 can send a clock signal having the appropriate frequency to data pump 54. Microcontroller 60 also sends a control signal to data pump 54 so that data pump 54 can be set up to operate at the frequency of the clock signal coming from frequency divider 52. If the voltage at phone line 74 is high, then the frequency of the clock signal is high, and the data transfer rate can be set high or low depending on the phone line quality. Since the mechanisms for adjusting the data transfer rate according to the phone line quality are well-known in the art, the details of such description is omitted. If the voltage at phone line 74 is low, then the frequency of the clock signal is set low, and the data transfer rate is set low. Once the frequency of the clock signal and the data transfer rate are set, data pump 54 accepts data from computer host 66, modulates and converts the data into analog signals and sends them to phone line 74.

In FIG. 3, once the modem goes "off hook," isolated power converter 64 receives DC power from phone line 74, converts it to an appropriate DC power supply voltage, and provides the DC power supply voltage to the various components of the modem. All components of the modem except microcontroller 60 derive their power entirely from phone line 74. Although microcontroller 60 derives its power from phone line 74 during the modem operation, it requires a small amount of power from computer battery 68 to perform a modem initiation procedure. The modem initiation procedure includes the following: accepting modem initiation commands from computer host 66 and sending an appropriate signal to the phone line so that current can flow from the phone line to the modem. Microcontroller 60 typically draws a current in the range of a micro-amp to a few milli-amps during the modem initiation procedure and does not drain computer battery 68 in any significant amount.

It should be noted that the data transfer rate is determined not only by the amount of the power available to the modem but also by the quality of the phone line. If the amount of the available power is high, and the quality of the phone line is good, then the modem can transfer the data at a high rate. If the amount of the available power is high, but the quality of the phone line is bad, then the data transfer occurs at a low data transfer rate. In addition, if the quality of the phone line is good, but the amount of the available power is low, then the data transfer again occurs at a low data transfer rate.

FIG. 4a is a flow chart showing the operation of a prior art modem that has essentially "unlimited" power available to the modem. Such modems include, but are not limited to, those that are used with non-portable computers and those shown in FIGS. 1a–1b. In the example shown in FIG. 4a, because the amount of the power available to the modem is high (or "unlimited"), the data transfer rate is determined only by the quality of the phone line. In FIG. 4a, at step 80, the modem places a call. Steps 82–86 are used to check the quality of the phone line. At step 82, the modem attempts to make a connection at 14400 bits-per-second. If successful, then the modem transfers data.

If, on the other hand, there is a lot of noise, distortion or interference in the phone line, the modem determines that the data transfer rate of 14400 bits-per-second is too high and attempts to establish a connection at a lower data transfer rate. It should be noted that the quality of the phone line connection is independent of the amount of power available from the phone line. The quality of the phone line is determined by the amount of noise, distortion and/or interference present in the line and not by the amount of the power available. The quality of the phone can be good or bad regardless of the amount of the power available. At step 84, the modem determines whether the quality of the phone line is good enough for 4800 bits-per-second. If it is, data is transferred. Otherwise, the modem tries to connect at 2400 bits-per-second. If the 2400 bits-per-second rate fails, then the process is aborted.

FIG. 4b is a flow chart showing the operation of a prior art modem powered mainly by a phone line, such as those shown in FIGS. 1c–1e. In the case shown in FIG. 4b, because the amount of the power available to the modem is small for a long subscriber loop--although the amount of the power available to the modem is high for a short subscriber loop length, the prior art modem has a fixed low data transfer rate (e.g., 2400 bits-per-second) so that the modem can be used for both short and long subscriber loop lengths. In the prior art, the data transfer rate is fixed to the lowest data transfer rate since the modem does not have the capabilities to determine the amount of the power available from the phone line and to set the modem communication rate accordingly. At step 90, the modem places a call. At step 92, the modem checks whether the quality of the phone line connection is good enough to transfer data at 2400 bits-per-second. If the modem can make a connection at 2400 bits-per-second, then data is transferred. Otherwise, the data transfer is aborted.

FIG. 5 illustrates the operation of a modem according to one embodiment of the present invention. The present invention is most useful when utilized as a phone-line powered modem, such as those shown in FIGS. 1d and 1e or any device including, but not limited to, a credit card verifier and an answering machine that transfers data over a phone line and needs to be powered mainly by the phone line. In addition, the present invention can be used in conjunction with other types of portable computers such as those shown in FIGS. 1a–1c or with non-portable computers as well.

Referring to FIG. 5, at step 100, the modem is "off hook." At steps 102 and 104, isolated voltage sensor 62 measures the voltage level of the phone line to determine the amount of the power available from the phone line. At step 102, if the voltage is high, indicating a large amount of available power, then at step 106, microcontroller 60 signals frequency divider 52 to send a high frequency clock signal to data pump 54. Microcontroller 60 also sends appropriate parameters to data pump 54 so that data pump 54 can be set up to operate at the high frequency clock rate (e.g., 30 MHz). Because the phone line provides a large amount of power to the modem, the modem is set up to operate at the high frequency clock rate and is capable of transferring data at a high data transfer rate. If the quality of the phone line is also good, then the modem can transfer data at the high data transfer rate.

At step 112 in FIG. 5, the modem places a call. Step 112 is followed by step 82 of FIG. 4a to determine the quality of the phone line. The modem attempts to make a connection at 14400 bits-per-second, 4800 bits-per-second and 2400 bits-per-second successively. Since the phone line's available power is high, data pump 54 operates at the high frequency clock rate (e.g., 30 MHz), and if the quality of the phone line is good, then the data is transferred at the high data transfer rate (e.g., 14400 bits-per-second). If, however, the quality of the phone line is bad, then while data pump 54 operates at the high frequency clock rate (e.g., 30 MHz), the modem transfers data at a low data transfer rate (e.g., 2400 bits-per-second).

Referring back to FIG. 5, at step 102, if the voltage level of the phone line is not high, then microcontroller 60 determines whether the voltage level is at least medium. If it is, then at step 108, microcontroller 60 signals frequency divider 52 to send a medium frequency clock signal to data pump 54. It also sends appropriate parameters to data pump 54 so that data pump 54 can operate at the medium frequency clock rate (e.g., 16 MHz). At step 114, the modem places a call. Step 114 is followed by step 84 in FIG. 4a. Depending on the quality of the phone line, a connection is made at 4800 bits-per-second (step 84) or 2400 bits-per-second (step 86) or is aborted (step 88).

Referring back to FIG. 5, at step 104, if the voltage level of the phone line is lower then the medium voltage level, then at step 110, microcontroller 60 signals frequency divider 52 to send a low frequency clock signal to data pump 54 and sends appropriate parameters to data pump 54 so that data pump 54 can operate at the low frequency clock rate (e.g., 4 MHz). After placing a call at step 116, the modem attempts to make a connection at a low data transfer rate (e.g., 2400 bits-per-second) at step 86 in FIG. 4a.

The differences between the capabilities of the present invention and the prior art modems are summarized in Tables 1 and 2. Referring to Table 1, in the present invention, after determining the amount of the power available from the phone line—to be high, medium or low, the present invention selects the corresponding frequency of the clock signal to be used in the modem. For example, if the amount of the available power is high (or the voltage level is high), then the frequency of the clock signal is set high. If the amount of the available power is medium, then the frequency of the clock signal is set medium. If the amount of the available power is low, then the frequency of the clock signal is set low. When the amount of the available power is high, the data transfer rate can be set to be high, medium or low depending on the quality of the phone line. When the amount of the available power is medium, the data transfer rate is set to be medium or low depending on the quality of the phone line. When the amount of the available power is low, the data transfer rate is set low. Although there are only three levels for each of the available power, frequencies of the clock signal and data transfer rates according one embodiment of the present invention, as shown in Table 1, there may be more levels or less levels in alternative embodiments.

TABLE 1

PRESENT INVENTION

| Available Power (or voltage level) | Frequency of Clock | Data transfer rate |
|---|---|---|
| High | High | High |
| High | High | Medium |
| High | High | Low |
| Medium | Medium | Medium |
| Medium | Medium | Low |
| Low | Low | Low |

Table 2 shows the capabilities of the prior art modems. Modem A represents a modem that has essentially "unlimited" power. Modem B represents a modem that has limited available power either because it derives its power from a phone line or from a combination of a phone line and a small battery. Modem A may represent any of the modems shown in FIGS. 1a–1b or a modem used in a non-portable computer. Modem B may be any of the modems shown in FIGS. 1c–1e. Referring to Table 2, in modem A, regardless of the amount of the power available from the phone line, the frequency of the clock signal is fixed. However, the data transfer rate may vary from high to low depending on the quality of the phone line. In Modem B, the frequency of the clock signal is fixed, and the data transfer occurs at a low data transfer rate regardless of the amount of the available power. Thus the prior art modems neither detect the amount of the power available from a phone line nor have variable frequencies for the clock signals.

TABLE 2

PRIOR ART

| MODEM A | | | MODEM B | | |
|---|---|---|---|---|---|
| Available Power | Frequency of Clock | Data transfer rate | Available Power | Frequency of Clock | Data transfer rate |
| N/A | Fixed | High | N/A | Fixed | low |
| N/A | Fixed | Medium | | | |
| N/A | Fixed | Low | | | |

FIG. 6 illustrates the implementation of data pump 54 of FIG. is according to one embodiment of the present invention. Data pump 54 is used to modulate the digital signals coming from computer host 66 and convert them into analog signals to send them to the phone line and to convert analog signals coming from the phone line into digital signals and demodulate the signals to send them to computer host 66.

Continuing to refer to FIG. 6, data pump 54 includes a digital signal processor (DSP) 122, a read-only memory (ROM) 126, a random-access memory (RAM) 128 and a digital-to-analog (D/A) and analog-to-digital (A/D) converter 124. ROM 126 contains a program or different sets of programs to operate data pump 54 at a selected clock rate. The pseudo code for such a program may be resented as follows:

```
DATA_PUMP(freq_clock)
  CASE freq_clock DO
    high: GOTO subroutine A;
    medium: GOTO subroutine B;
    low: GOTO subroutine C;
  END CASE;
```

Each of subroutines A, B and C contains computer instructions for data pump 54 to modulate or demodulate data. The only difference between the subroutines is the frequency of the clock signal at which data pump operates. In one embodiment, the present invention may implement the pseudo code shown above in a digital signal processor such as TMS320 manufactured by Texas Instrument and use TMS320 as a digital signal processor for data pump 54. Since the details of TMS320 can be found in TMS320 Second-Generation Digital Signal Processors data sheet (Texas Instruments, Texas 1989), the detailed description on modulation and demodulation operations is omitted.

FIG. 7 illustrates the implementation of microcontroller 60 of FIG. is according to one embodiment of the present invention. Microcontroller 60 includes a microprocessor 132, a ROM 136 and a RAM 138. Microcontroller 60 uses DTE interface 58 to communicate with computer host 66. DTE interface 58 may be a serial or parallel I/O port. Microcontroller 60 also has peripheral I/O ports for controlling data pump 54, line isolator 56, isolated voltage sensor 62 and frequency divider 52.

In FIG. 7, after microcontroller 60 directs isolated voltage sensor 62 to measure the voltage level of the phone line, microcontroller 60 determines the amount of the power available from the phone line. Depending on the power level, microcontroller 60 signals frequency divider 52 to send a high frequency clock signal, a medium frequency clock signal or a low frequency clock signal. Microcontroller 60 also sends a signal to data pump 54 so that data pump 54 can be configured for the appropriate clock rate. After the proper data transfer rate is set, microcontroller 60 directs data pump to start transferring the data. Microcontroller 60 may implement the pseudo code shown below:

```
BEGIN
    GO off_hook;
    MEASURE(line_voltage);
    CASE line_voltage DO
        high:
            SET_FREQ_CLOCK(high);
            SET_DATA_PUMP(high);
            SET_BIT_RATE;
        medium:
            SET_FREQ_CLOCK(medium);
            SET_DATA_PUMP(medium);
            SET_BIT_RATE;
        low:
            SET_FREQ_CLOCK(low);
            SET_DATA_PUMP(low);
            SET_BIT_RATE;
    END CASE;
    GOTO data_mode_start;
END
```

As discussed earlier, it will be appreciated that although in the above pseudo code, the line voltages and clock frequencies each have three levels—high, medium and low—according to one embodiment, they may have more levels or less levels in alternative embodiments. In addition, although the amount of the power available from the phone line is determined by measuring the voltage level at the phone line, there are other methods of determining the amount of the power available such as measuring the current or the power itself.

The computer instructions of the above pseudo code reside in ROM 136. The present invention may implement the pseudo code shown above in a microcontroller such as 80C196 manufactured by Intel Corporation. The details of Intel microcontroller 80C196 may be found in 80C196KB10/83C196KB10/80C196KB12/83196KB12 Commercial/Express CHMOS Microcontroller data sheet, Order number 270918-002 (Intel Corp. 1991).

Frequency divider 52 in FIG. is may be implemented in the present invention by programming a commercially available product such as SN74HC160 manufactured by Texas Instrument. In one embodiment, the frequency divider 52 is programmed to produce three clock signals having different frequencies and to output a selected one of the three clock signals according to the control signal coming from microcontroller 60. In another embodiment, frequency divider 52 may be programmed to produce more or less number of clock signals. The details of SN74HC160 can be found in SN54HC160, SN54JC162, SN74JC160, SN74HC162 Synchronous 4-Bit Decade Counters data sheet (Texas Instrument, Texas).

FIG. 8 shows a computer system that may utilize a modem in accordance with the present invention. A computer host (hereinafter a host) 1000 includes a memory 1008 and a central processor 1002. Memory 1008 and central processor 1002 are those typically found in most general purpose computers and almost all special purpose computers. In fact, these devices contained within computer host 1000 are intended to be representative of the broad category of data processors and memory. Many commercially available computers having different capabilities may be utilized in the present invention.

A system bus 1016 is provided for communicating information. A display device 1010 utilized with the computer system of the present invention may be a liquid crystal device, cathode ray tube or other display device suitable for creating graphic images and/or alphanumeric characters recognizable to a user. The computer system may also include an alphanumeric input device 1012 including alphanumeric and function keys coupled to bus 1016 for communicating information and command selections to central processor 1002, and a cursor control device 1018 coupled to bus 1016 for communicating user input information and command selections to central processor 1002 based on a user's hand movement. Cursor control device 1018 allows the user to dynamically signal the two-dimensional movement of the visual symbol (or cursor) on a display screen of display device 1010. Many implementations of cursor control device 1018 are known in the art, including a track ball, mouse, pen, joystick or special keys on the alphanumeric input device 1012, all capable of signaling movement in a given direction or manner of displacement.

The computer system of FIG. 8 also includes an interface device 1019 coupled to bus 1016 for communicating information to and from the computer system. Interface device 1019 may be coupled to a modem 1020, a microphone, a speaker, a network system, other memory devices, other computers, etc. Also available for interface with the computer system of the present invention is a data storage device 1017 such as a magnetic disk or optical disk drive, which may be communicatively coupled with bus 1016, for storing data and instructions. The computer system of FIG. 8 may also include a printer for outputting data.

While the present invention has been particularly described with reference to the various figures and embodiments, it should be understood that these are for illustration only and should not be taken as limiting the scope of the invention. Many changes and modifications may be made to the invention, by one having ordinary skill in the art, without departing from the spirit and scope of the invention. It should be noted that although specific data transfer rates such as 14400 bits-per-second and 2400 bits-per-second are used to represent a high and a low data transfer rate, respectively, these are mere examples and are not the high and low limits of the data transfer rates possible for the present invention.

What is claimed is:

1. A method of operating a device for transferring data over a phone line, said method comprising the steps of:

determining the amount of the power available from said phone line by comparing said amount of the power available to a predetermined set of power levels;

selecting a clock rate from a plurality of clock rates, at least one of said plurality of clock rates producing a data transfer rate in excess of 2400 bits-per-second, said selecting of said clock rate for said device based on the amount of power available from said phone line; and setting said device to operate at said clock rate.

2. The method according to claim 1 further comprising the steps of:

placing a call;

selecting a data transfer rate; and transferring said data at said data transfer rate.

3. The method according to claim 2 further comprising the step of setting said device off hook prior to measuring the amount of the power available.

4. The method according to claim 3 wherein the step of determining the amount of the power available from said phone line includes the step of measuring the voltage level of said phone line.

5. The method according to claim 4 wherein the step of determining the amount of the power available from said phone line further includes the step of comparing said voltage level to a predetermined set of voltage levels.

6. The method according to claim 3 wherein the step of selecting said clock rate for said device includes the steps of generating multiple clock signals having different frequencies and selecting one of said multiple clock signals.

7. The method according to claim 3 wherein the step of setting said device to operate at said clock rate includes the step of selecting a subroutine for said clock rate.

8. The method according to claim 3 wherein the step of selecting said data transfer rate includes the steps of monitoring the quality of said phone line and successively selecting a lower data transfer rate.

9. An apparatus for transferring data over a phone line comprising:

a clock generator for generating a first clock signal of a first frequency;

a frequency divider coupled to said clock generator for generating multiple clock signals of different frequencies, at least one of said clock signals enabling said apparatus to transfer data to a rate greater than 2400 bits-per-second, said frequency divider being configured to output a selected one of said multiple clock signals;

a data pump coupled to said frequency divider, said data pump converts data from a first form into a second form;

a sensor coupled to the phone line, said sensor sensing the amount of the power available from said phone line and enabling said apparatus to transfer data at a rate greater than 2400 bits-per-second when said sensor determines sufficient power available from said phone line; and a microcontroller coupled to said frequency divider, to said data pump and to said sensor, said microcontoller controls said frequency divider, said data pump and said sensor.

10. The apparatus according to claim 9 further comprising a line isolator coupled to said data pump and to said microcontroller for coupling to said phone line and for blocking hazardous electrical signals from coming into said data pump and said microcontroller.

11. The apparatus according to claim 10 further comprising an interface device coupled to said microcontroller for coupling said apparatus to a processor.

12. The apparatus according to claim 11 further comprising a power converter for coupling to said phone line and for converting a direct-current (DC) voltage of said phone line at a first level to a DC power supply voltage at a second level, said DC power supply voltage provided to said apparatus.

13. The apparatus according to claim 9 wherein said sensor includes means for measuring the voltage level of said phone line.

14. The apparatus according to claim 13 wherein said microcontroller includes a logic unit for comparing said voltage level to a predetermined set of voltage levels.

15. The apparatus according to claim 9 wherein said microcontroller includes means for sending a signal to said frequency divider so that said frequency divider outputs said selected one of said multiple clock signals.

16. The apparatus according to claim 9 wherein said microcontroller includes means for sending a signal to said data pump; and said data pump includes means for receiving said signal from said microcontroller and means for operating said data pump using said selected one of said multiple clock signals.

17. The apparatus according to claim 9 wherein said sensor includes an analog-to-digital converter.

18. A computer system comprising:

a memory subsystem for storing an instruction;

a system bus coupled to said memory subsystem to provide a data communication path for said computer system;

a processor coupled to said system bus for decoding said instruction;

an interface coupled to said system bus; and an apparatus coupled to said interface for transferring data over a phone line, said apparatus including:

a sensor for coupling said apparatus to said phone line and for sensing the amount of the power available from said phone line;

a clock generator for generating a first clock signal of a first frequency;

a frequency divider coupled to said clock generator for generating multiple clock signals of different frequencies, at least one of said clock signals enabling said apparatus to transfer data at a rate exceeding 2400 bits-per-second when said sensor determines sufficient power is available from said phone line; said frequency divider configured to output a selected one of said multiple clock signals;

a data pump coupled to said frequency divider for converting data from a first form into a second form; and a microcontroller coupled to said frequency divider, to said data pump, to said sensor and to said interface for controlling said frequency divider, said data pump and said sensor.

19. An apparatus for transferring data over a phone line at a data rate exceeding 2400 bits-per-second, said apparatus comprising:

a voltage sensor for coupling said apparatus to said phone line and for sensing the amount of the power available from said phone line by sensing the voltage of the phone line; and a data control logic unit for converting data from a first form into a second form and for adjusting a clock rate and a data transfer rate of said apparatus, said data transfer rate exceeding 2400 bits-per-second when said voltage sensor senses sufficient power available from said phone line.

20. A method of powering a modem, said method comprising the steps of:

measuring a DC voltage across a phone line;

utilizing said DC voltage as a source of power for said modem; and adjusting a transfer rate of data to and from said modem based on said DC voltage across the phone line, said transfer rate exceeding 2400 bits-per-second when the DC voltage is sufficient.

21. A communications apparatus capable of data transfer rates exceeding 2400 bits-per-second connected to a phone line, said apparatus comprising:

circuitry which converts a DC voltage from the phone line into a power source for supporting data transfer rates exceeding 2400 bits-per-second;

a sensor which detects said DC voltage from the phone line, an output of said sensor used to determine an appropriate clock rate for use by said apparatus, said clock rate used to determine transmission rate of said apparatus.

22. The communications apparatus of claim 21, further comprising:

a micro controller which uses said output of said sensor to generate a control signal.

23. The communications apparatus of claim 22, further comprising:

a frequency divider which sets said clock rate utilized by a data pump in said communications apparatus, said frequency divider controlled by said control signal received from said micro controller.

24. The method of operating a device for transferring data over a phone line, said method comprising the steps of:

connecting said device to the phone line;

setting said device off-hook;

when off-hook, measuring a characteristic of the phone line indicative of the amount of the power available from the phone line;

selecting a clock rate from a plurality of clock rates, at least one of said plurality of clock rates producing data transfer rate in excess of 2400 bits-per-second said selecting of said clock rate for said device responsive to the amount of the power available from the phone line and the quality of the phone line; and operating said device at said clock rate while powering said device from the phone line.

25. A system for transferring data over a phone line, said device comprising:

a first circuit coupled to the phone line, said first circuit measures a characteristic of the phone line indicative of the amount of power available from the phone line, said first circuit also measures the quality of the phone line and sets said clock rate responsive to the quality of the phone line and the power available from the phone line;

a data pump capable of transferring data at transfer rates exceeding 2400 bits-per-second when said first circuit indicates sufficient power available from the phone line, said data pump capable of operating at more than one clock rate;

a terminal connecting the phone line to said data pump; and a second circuit powered by the phone line and powering said data pump.

* * * * *